United States Patent
Messing et al.

(10) Patent No.: US 11,174,837 B2
(45) Date of Patent: Nov. 16, 2021

(54) METHOD OF CONTROLLING A WIND TURBINE AND WIND TURBINE

(71) Applicant: Wobben Properties GmbH, Aurich (DE)

(72) Inventors: Ralf Messing, Aurich (DE); Rodolphe Lebosq, Eversmeer (DE); Florian Rubner, Aurich (DE)

(73) Assignee: Wobben Properties GmbH, Aurich (DE)

(*) Notice: Subject to any disclaimer, the term of this patent is extended or adjusted under 35 U.S.C. 154(b) by 178 days.

(21) Appl. No.: 16/303,537

(22) PCT Filed: May 31, 2017

(86) PCT No.: PCT/EP2017/063086
§ 371 (c)(1),
(2) Date: Nov. 20, 2018

(87) PCT Pub. No.: WO2017/207598
PCT Pub. Date: Dec. 7, 2017

(65) Prior Publication Data
US 2020/0056585 A1  Feb. 20, 2020

(30) Foreign Application Priority Data
Jun. 2, 2016 (DE) .................. 10 2016 110 190.7

(51) Int. Cl.
*F03D 7/04* (2006.01)
*F03D 7/02* (2006.01)

(52) U.S. Cl.
CPC .......... *F03D 7/0224* (2013.01); *F03D 7/043* (2013.01); *F05B 2270/1033* (2013.01);
(Continued)

(58) Field of Classification Search
CPC .................. F03D 7/0224; F03D 7/043; F05B 2270/1033; F05B 2270/32; F05B 2270/323; F05B 2270/328
See application file for complete search history.

(56) References Cited

U.S. PATENT DOCUMENTS 6,837,681 B2   1/2005  Wobben
7,351,033 B2 *  4/2008  McNerney ............ F03D 7/0224
                                                     416/1
(Continued)

FOREIGN PATENT DOCUMENTS

DE   102011081795 A1   2/2013
EP       1918581 A2    5/2008
(Continued)

OTHER PUBLICATIONS

Engineering ToolBox, (2004). Density of Moist Humid Air. [online] Available at: https://www.engineeringtoolbox.com/density-air-d_680.html [Jul. 17, 2020]. (Year: 2006).*

*Primary Examiner* — Justin D Seabe
*Assistant Examiner* — Theodore C Ribadeneyra
(74) *Attorney, Agent, or Firm* — Seed Intellectual Property Law Group LLP

(57) ABSTRACT a method of controlling a wind power installation comprising the steps: detecting a precipitation in the region of the wind power installation by a precipitation sensor, and controlling the wind power installation in a first operating mode based on a first pitch angle characteristic in which the pitch angle is set in dependence on the power, and in a second operating mode based on a second pitch angle characteristic, wherein the first operating mode is selected if there is no precipitation and the second operating mode is selected if there is precipitation.

9 Claims, 4 Drawing Sheets

(52) U.S. Cl.
CPC ..... *F05B 2270/32* (2013.01); *F05B 2270/323* (2013.01); *F05B 2270/328* (2013.01)

(56) References Cited

U.S. PATENT DOCUMENTS

| | | | |
|---|---|---|---|
| 8,217,524 B2* | 7/2012 | Nakashima | F03D 7/0224 |
| | | | 290/44 |
| 9,127,642 B2* | 9/2015 | Zhu | F03D 7/00 |
| 9,845,790 B2 | 12/2017 | de Boer et al. | |
| 2008/0001409 A1 | 1/2008 | Schellings | |
| 2008/0112807 A1 | 5/2008 | Uphues et al. | |
| 2009/0295160 A1* | 12/2009 | Wittekind | F03D 7/046 |
| | | | 290/44 |
| 2010/0054940 A1 | 3/2010 | Honhoff | |
| 2010/0140938 A1* | 6/2010 | Cook | F03D 7/043 |
| | | | 290/44 |
| 2010/0143119 A1 | 6/2010 | Kooijman et al. | |
| 2010/0143121 A1 | 6/2010 | Haans et al. | |
| 2010/0320761 A1* | 12/2010 | Schwarze | F03D 7/02 |
| | | | 290/44 |
| 2011/0280722 A1* | 11/2011 | Stiesdal | F03D 7/045 |
| | | | 416/1 |
| 2012/0061957 A1* | 3/2012 | Steinmetz | F03D 7/043 |
| | | | 290/44 |
| 2012/0146332 A1 | 6/2012 | Kabatzke et al. | |
| 2012/0148402 A1 | 6/2012 | Kabatzke et al. | |
| 2014/0301842 A1* | 10/2014 | Koerber | F03D 7/0224 |
| | | | 416/1 |
| 2014/0367967 A1* | 12/2014 | Ossyra | F03D 7/0296 |
| | | | 290/44 |
| 2014/0377065 A1* | 12/2014 | Matesanz | F03D 7/0296 |
| | | | 416/1 |
| 2015/0093242 A1 | 4/2015 | Enevoldsen | |
| 2015/0300319 A1* | 10/2015 | Pedersen | F03D 7/0264 |
| | | | 416/1 |
| 2017/0268486 A1* | 9/2017 | Muller | F03D 7/0224 |
| 2018/0187647 A1* | 7/2018 | Perley | F03D 7/043 |

FOREIGN PATENT DOCUMENTS

| | | |
|---|---|---|
| EP | 2336557 A1 | 6/2011 |
| EP | 2857677 A1 | 4/2015 |
| EP | 2976525 B1 | 7/2018 |
| JP | 2003-239843 A | 8/2003 |
| JP | 2003-532835 A | 11/2003 |
| JP | 2011-106298 A | 6/2011 |
| JP | 2014-525539 A | 9/2014 |
| KR | 20140087704 A | 7/2014 |
| RU | 2399962 C1 | 9/2010 |
| RU | 112955 U1 | 1/2012 |
| RU | 2499913 C1 | 11/2013 |
| UA | 102458 C2 | 7/2013 |
| WO | 0186142 A1 | 11/2001 |

* cited by examiner

METHOD OF CONTROLLING A WIND TURBINE AND WIND TURBINE

BACKGROUND

Technical Field

The present disclosure concerns a method of controlling a wind power installation and a wind power installation.

Description of the Related Art

Modern wind power installations typically have three rotor blades, the angle of incidence or pitch angle of which is adjustable. For that reason, at least one pitch or incidence angle motor can be provided in the region of the rotor blade root or at the transition between the rotor blade root and the hub region of the wind power installation. The pitch angle or the angle of incidence of the rotor blades can be adjusted by activation of that motor. The change in the pitch angle or the angle of incidence occurs in particular when the wind power installation comes into the range of its nominal power output and the wind speed rises further. By altering the pitch angle the aim is to provide that the mechanical loading acting on the wind power installation is reduced. The area of the rotor blade which is exposed to the wind can be reduced by altering the pitch angle.

The dimensions of the rotor blades of a wind power installation are such that the rotor blades of the installation (at all operating points of the installation) can have the wind flowing around them without flow detachment in order to prevent the flow from breaking away from the rotor blade, which can lead to power losses suffered by the wind power installation. The freedom from flow detachment from the rotor blade around which the wind flows must be ensured under all climatic or meteorological conditions.

On the German patent application from which priority is claimed the German Patent and Trade Mark Office searched the following documents: US 2010/0054940 A1, US 2010/0143121 A1, WO 2001/086142 A1 and US 2008/0001409 A1.

BRIEF SUMMARY

Provided is a method of controlling a wind power installation which permits effective operation of the wind power installation under differing climatic conditions or meteorological conditions.

Thus there is provided a method of controlling a wind power installation. Precipitation in the region of the wind power installation is detected by means of a precipitation sensor. The wind power installation is controlled in a first operating mode based on a first pitch angle characteristic in which the pitch angle is set in dependence on the power and in a second operating mode based on a second pitch angle characteristic in which the pitch angle is set in dependence on the power. The second pitch angle characteristic is different from the first pitch angle characteristic. The first operating mode is selected when there is no precipitation and the second operating mode is selected when there is precipitation.

As the second pitch angle characteristic is different from the first pitch angle characteristic there are different pitch angles with an identical power. In that way the pitch angle in dry weather can be different from the pitch angle when there is precipitation.

The invention concerns the notion of controlling a wind power installation based on at least two different pitch angle characteristics. In that respect a pitch angle characteristic specifies a value of a pitch angle for a delivered electric power. The decision as to which of the two characteristics is to be used is taken in dependence on whether there is precipitation.

In a first operating mode the pitch angle of the rotor blades is in accordance with a first pitch angle characteristic and in the second operating mode the wind power installation can be operated in accordance with a second pitch angle characteristic. The first operating mode can represent for example a normal operating mode, for example without rain, while the second operating mode is activated when precipitation for example rain or snow has been detected by a precipitation sensor. In the first operating mode for example dry weather can predominate while in the second operating mode there can be precipitation.

The present invention is based on the realization that, in the event of rain or with a wet rotor surface, there can be a turbulent boundary layer flow. The result of a turbulent boundary layer flow can be that, when wind flows around the profile of the rotor blade of the wind power installation, smaller angles of blade incidence can lead to flow detachment. That can occur in particular at the trailing edge of the rotor blade. Flow detachment when the rotor blades are wet can already occur at smaller angles of incidence than in the case of a rotor blade with a dry surface. In the case of rotor blades with a dry surface it is possible to reckon on a laminar configuration of the boundary layer flow away from the leading edge before the flow can change over into a turbulent flow. If the wind power installation and thus the rotor blades of the wind power installation are operated when there is precipitation like for example rain then smaller effective profile angles of incidence should be selected over the rotor radius than when the rotor blades are dry. Accordingly it is proposed that an operating characteristic with a different blade angle is to be used in the case of precipitation. A control unit can correspondingly select a different operating characteristic in dependence on detected precipitation and can set a different blade angle so that the respective angle of incidence is correspondingly altered along the rotor blade.

A distinction is made between an angle of incidence which describes the setting of the rotor blade profile in relation to the wind or a preferred direction at the respective location along the rotor blade, and a blade angle which can also be synonymously referred to as the pitch angle denoting the angle set at the blade root.

According to an embodiment it is proposed that switching over from the second operating mode into the first operating mode is effected as soon as it was detected that precipitation is no longer falling and a predetermined latency time has elapsed since such detection. If the wind power installation is operated when there is rain or when there is another precipitation then in that case the wind power installation is operating in the second operating mode. When the precipitation has finished the wind power installation should switch back into the first operating mode.

It was however recognized that in particular a moist rotor blade makes operation with the second operating mode appropriate. To take account of that it is proposed that a latency time be observed so that that latency time is first observed before switching back into the first operating mode so that the rotor blade can dry in that latency time. The latency time can be predetermined. Preferably it is predetermined in dependence on environmental parameters which can influence the process of drying of the rotor blade, in particular in dependence on a wind speed and/or an outside temperature. Preferably the latency time is in a range of 5 to 30 minutes.

No latency time is needed for switching over from the first operating mode to the second operating mode or it can be selected markedly shorter as a second latency time, for example shorter by at least 80% or at least 90% than the first latency time for switching over from the second operating mode to the first.

Further embodiments by way of example of the invention are subject-matter of the appendant claims.

BRIEF DESCRIPTION OF THE SEVERAL VIEWS OF THE DRAWINGS

Advantages and embodiments by way of example of the invention are described in greater detail hereinafter with reference to the drawing.

DETAILED DESCRIPTION

Figure 1:
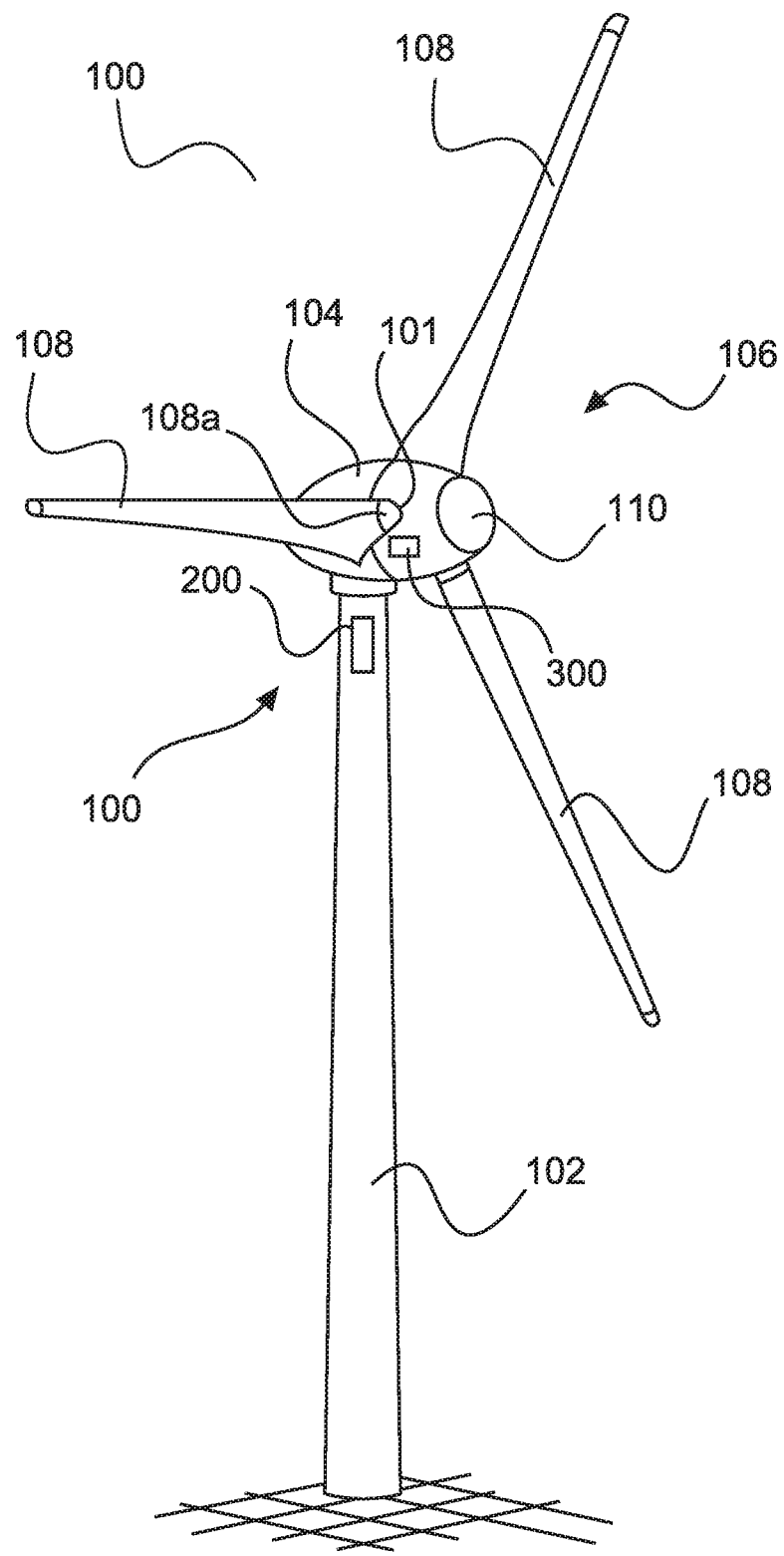
FIG. 1 shows a diagrammatic view of a wind power installation according to the invention.

FIG. 1 shows a wind power installation 100 having a pylon 102 and a pod 104. Arranged at the pod 104 is an aerodynamic rotor 106 having a spinner 110 and three rotor blades 108. The rotor blades 108 are each fixed to a hub by a rotor blade root 108a. The rotor 106 is caused to rotate by the wind in operation and in that way drives a generator (not shown) in the pod 104. The pitch angle of the rotor blades 108a can be altered or adjusted by pitch motors 101.

The wind power installation further has a control unit 200 for controlling operation of the wind power installation and a sensor 300 for detecting precipitation. The sensor can be in the form of a precipitation sensor 300.

Different pitch characteristics can be stored in the control unit 200. The control unit 200 is adapted on the basis of the measurement results of the precipitation sensor 300 to select one of the stored pitch characteristics and to correspondingly control operation of the wind power installation. In that respect the control unit 200 can set in particular the pitch angle of the rotor blades 108.

Figure 2:
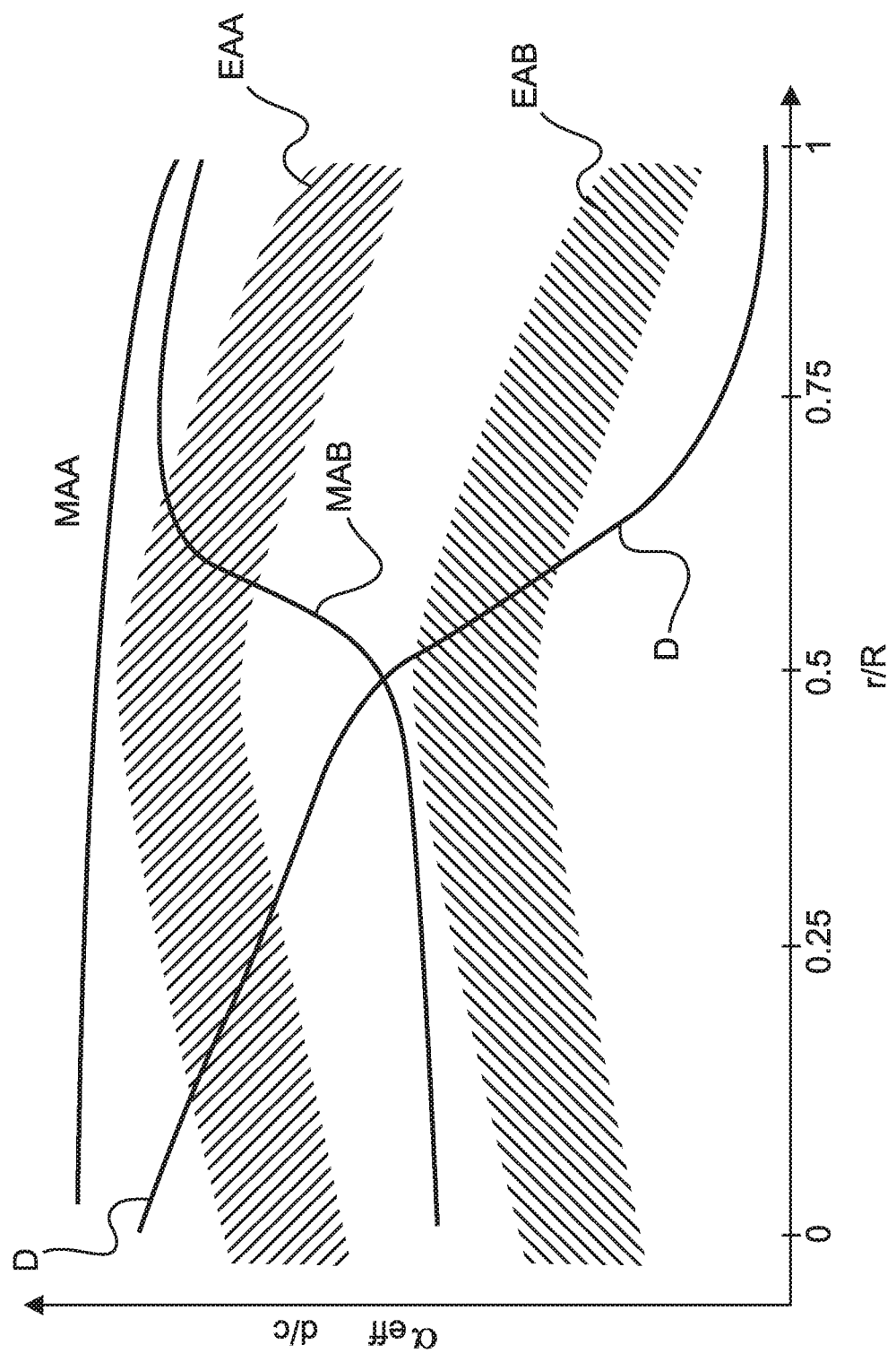
FIG. 2 shows a diagrammatic view of effective profile incidence angle conditions at a rotor blade of a wind power installation according to the invention, and FIGS. 3 to 6 each show a graph to illustrate pitch angle characteristics according to the invention.

FIG. 2 shows a diagrammatic view of the effective pitch incidence angle conditions at a rotor blade of a wind power installation according to the invention.

FIG. 2 shows different effective angles of incidence of the profiles at the rotor blades of the wind power installation according to the invention under different meteorological conditions.

FIG. 2 shows the maximum permissible profile angle of incidence MAA for a dry blade, the maximum permissible profile angle of incidence MAB for a wet blade, a relative thickness configuration D, an effective profile incidence angle range EAA in the first operating mode A (dry) and an effective profile incidence angle range EAB in a second operating mode B (wet). The relative thickness configuration D can represent a typical configuration of a relative profile thickness of a rotor blade over the radius of the wind power installation, which has been standardized with the maximum rotor radius.

As can be seen from FIG. 2 the maximum permissible profile angle of incidence MAB in wet conditions (operating mode B) is always less than the corresponding maximum permissible profile angle of incidence MAA for a dry blade (operating mode A), the greater the relative thickness of the rotor blade is (this being shown by the relative thickness configuration D), the correspondingly greater becomes the difference between the maximum permissible profile angle of incidence MAA with a dry blade and the maximum permissible profile angle of incidence MAB for a wet blade. For the ratio between radius and maximum rotor radius r/R of less than 0.65 it can be seen that there is a marked drop in the maximum permissible profile angle of incidence MAB for a wet blade, that is to say in that region the maximum permissible angle of incidence MAB of a wet rotor blade differs considerably from the maximum permissible profile angle of incidence MAA of a dry rotor blade.

FIG. 2 shows the effective profile angles of incidence EAA occurring in operation of the wind power installation in the dry mode of operation and the effective profile angles of incidence EAB in the wet mode of operation. As can be seen from those two curves there are considerable differences between a dry rotor blade and a wet rotor blade. As can be seen in FIG. 2, in the first operating mode A, more specifically in the dry, the rotor blade can be operated with greater profile angles of incidence than in the case of a wet rotor blade, namely in the second operating mode B.

FIGS. 3 to 6 respectively show different pitch angle characteristics according to the invention. The illustrated pitch angle characteristics concern a so-called part-load operation in which the wind power installation has not yet reached its nominal power or at all events has reached the end of the illustrated characteristics. The illustrated pitch characteristics are thus respectively provided for a range up to the attainment of nominal power. The pitch angle characteristic PA for the first operating mode (dry rotor blade) has a first portion PA1 with a constant pitch angle for different output powers P. The pitch characteristic has a point PA2 at an output power P3, from which the constant portion PA1 goes into a second portion PA3 with a gradient. The pitch angle characteristic PB in the second operating mode B (wet or precipitation) also has a first portion PB1 which has a constant pitch angle for different electrical output powers P, a transitional point PB2 at an output power P3 and a second portion PB3 which has a gradient, that is to say with an increase in the output power there is an increase in the pitch angle.

Figure 3:
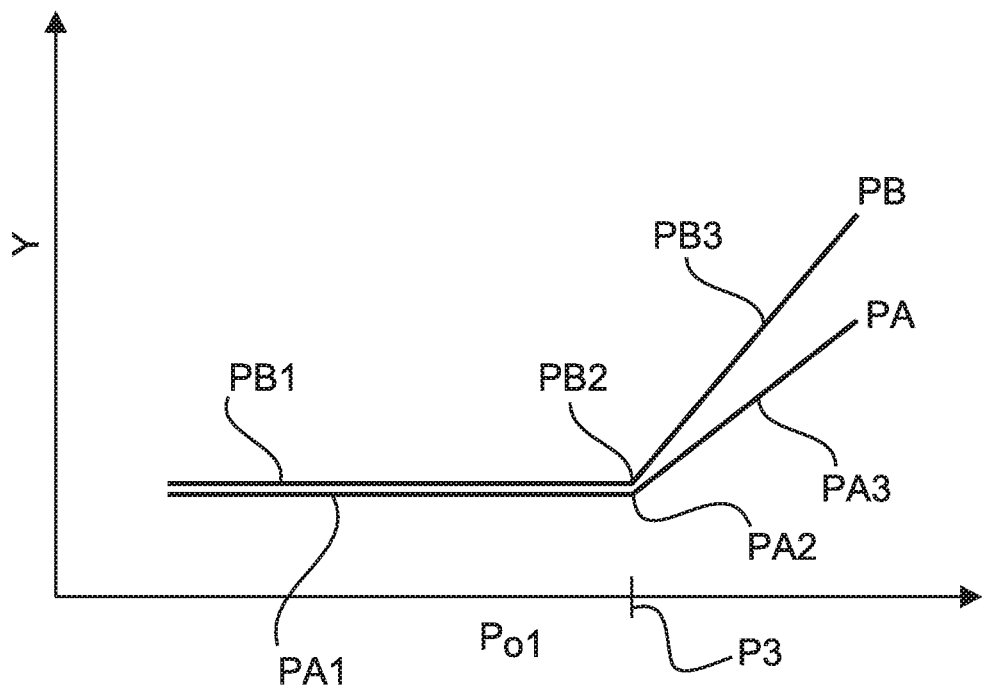

In FIG. 3 the point PA2 and the point PB2 are substantially at the same output power P3. The first portions PA1, PB1 have substantially the same pitch angle. The second portions PA3, PB3 involve different gradients.

Figure 4:
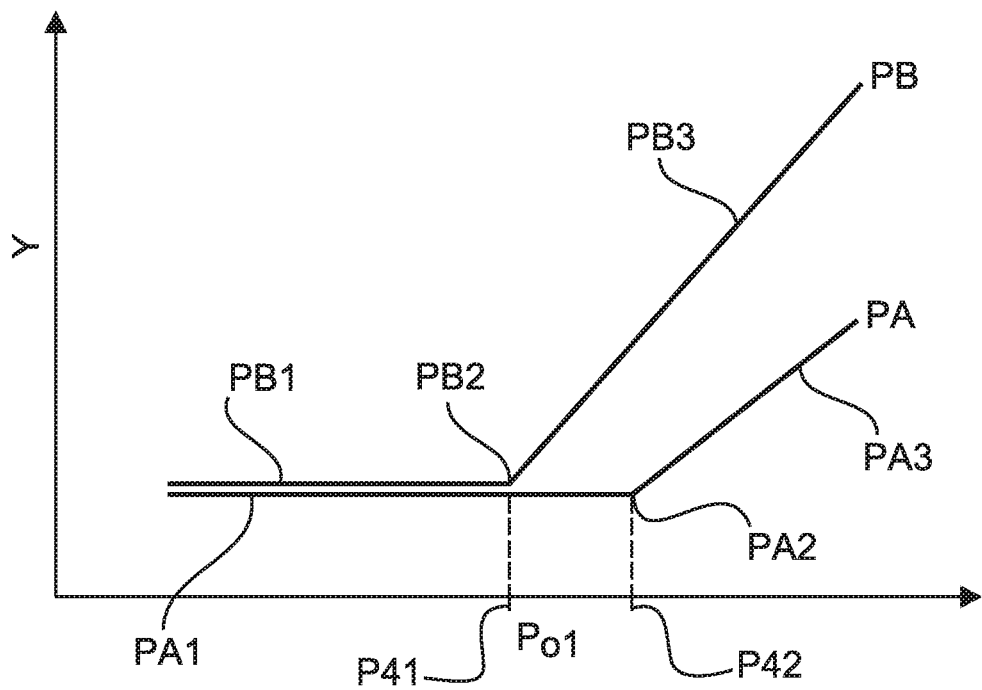

In the embodiment shown in FIG. 4 the point PB2 is at a lower output power P41 than at the point PA2 (output power P42). The gradients of the second portions PB3, PA3 can also be different.

In the embodiment of FIG. 3 and FIG. 4 the pitch angles in the first portion PB1, PA1 as far as the point PB2 are the same and the pitch angle values differ from each other only at a higher output power.

Figure 5:
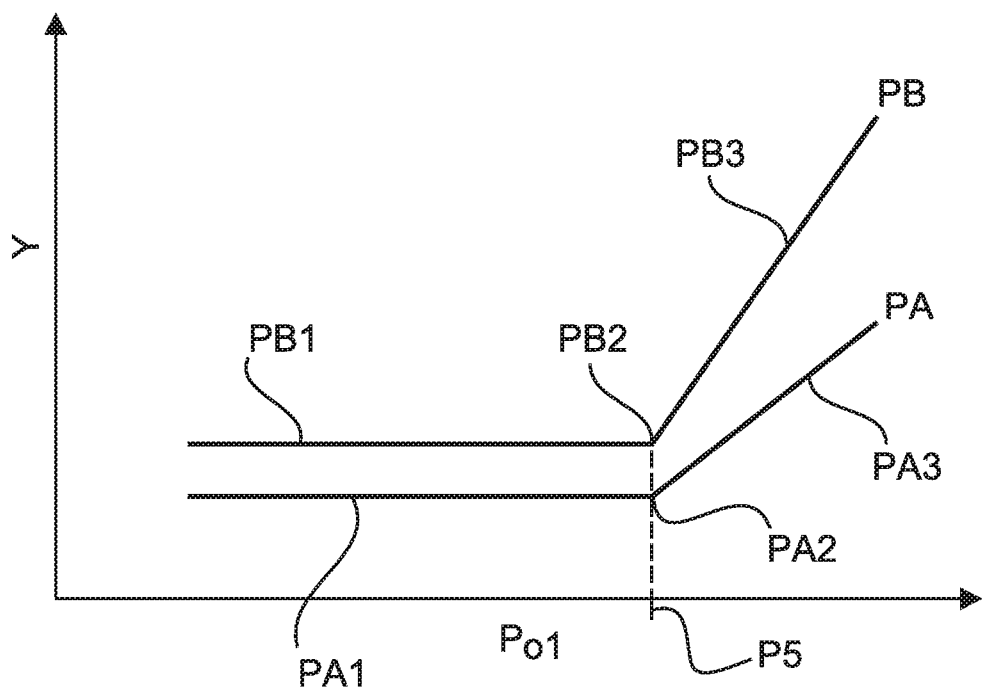

In the embodiment of FIG. 5 the pitch angles in the first portion PB1 are higher than in the first portion PA1. The points PB2, PA2 occur at an output power P5.

Figure 6:
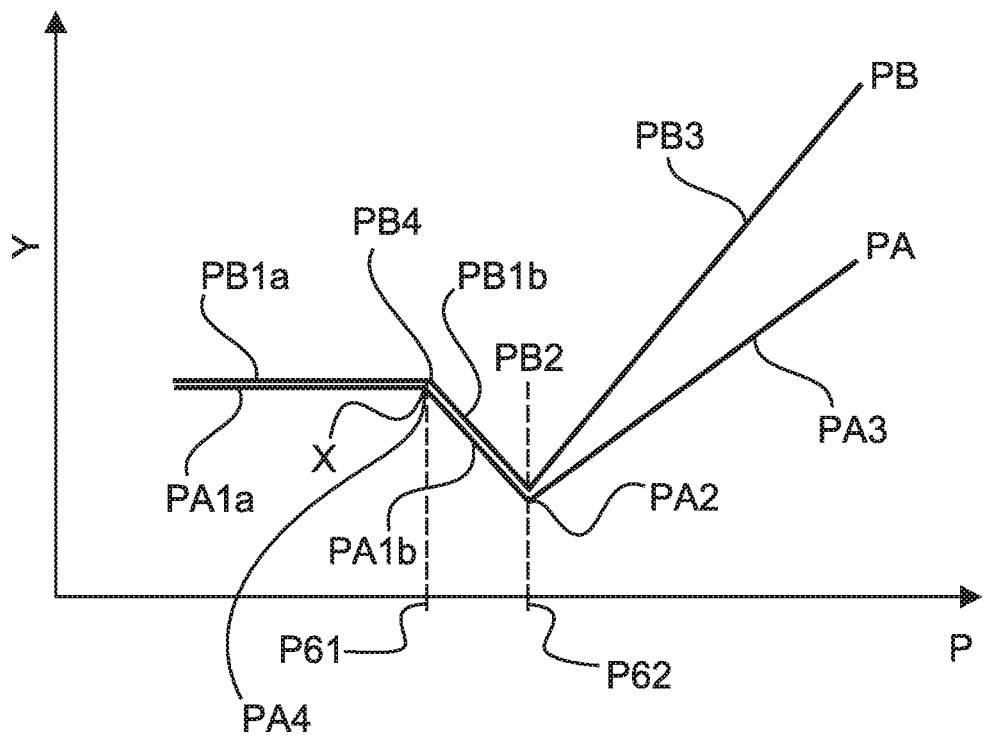

In the embodiment of FIG. 6 the pitch angles in the respective first ranges PB1, PA2 as far as a point PB2, PA2 are the same and the gradient of the second portions PB3, PA3 involve a different gradient only from that point PB2, PA2. As far as a power P61 the pitch angle is identical and constant in both operating modes. Between the output power P61 and the output power P62 the pitch angle falls with increasing output power. That applies to both operating modes. From the point P62 the pitch angles of the first and second characteristics rise with different gradients.

The control unit 200 uses the first or second pitch characteristic for controlling the pitch angles of the rotor blades in dependence on the delivered output power.

By means of the precipitation sensor 300 it is possible to detect whether the wind power installation is being operated under dry conditions or when there is precipitation. If the wind power installation is operated under dry conditions the first operating mode can then be adopted by means of the control unit 200. In that operating mode the wind power installation is operated based on the first pitch characteristic PA. If the precipitation sensor detects that there is precipitation then the control unit 200 controls operation of the wind power installation and in particular the pitch angles in accordance with the second pitch angle characteristic PB. Switching over between the operating modes can be implemented steplessly. When switching over the operating modes the strength of the precipitation can also be taken into consideration.

It is therefore possible that higher power coefficients can be achieved in the first operating mode A than in the second operating mode B as greater angles of incidence can result in higher lift coefficients and thus higher axial indication factors. The wind power installation can be operated with a higher output power measured in relation to time by virtue of the distinction as to whether there is or is not precipitation.

The invention claimed is:

1. A method of controlling a wind power installation comprising:
   detecting precipitation in a region of the wind power installation;
   controlling the wind power installation in a first operating mode based on a first pitch angle characteristic, in which a pitch angle of a rotor blade is set in dependence on a desired output power; and
   controlling the wind power installation in a second operating mode based on a second pitch angle characteristic, in which the pitch angle of the rotor blade is set in dependence on the desired output power,
   wherein the second pitch angle characteristic is different from the first pitch angle characteristic, and
   wherein the first operating mode is selected when precipitation is not detected and the second operating mode is selected when precipitation is detected.

2. The method according to claim 1 wherein the first and second pitch characteristics respectively have:
   a first straight portion in which the pitch angle remains unchanged, and
   a second portion having a gradient so that the pitch angle is increased with increasing output power.

3. The method according to claim 2, wherein:
   a length of the first straight portion of the first pitch angle characteristic is different from a length of the first straight portion of the second pitch angle characteristic.

4. The method according to claim 1 wherein the first and second pitch characteristics are respectively provided for a range until nominal output power is reached.

5. The method according to claim 1, comprising switching from controlling the wind power installation in the second operating mode to controlling the wind power installation in the first operating mode in response to:
   detecting that precipitation is no longer falling, and
   waiting until a predetermined latency time has elapsed after the detection that precipitation is no longer falling.

6. A wind power installation, comprising:
   a rotor having a plurality of rotor blades, each having a rotor blade root, wherein the pitch angles of the rotor blades are adjustable by pitch motors which engage the respective rotor blade roots;
   a precipitation sensor configured to detect precipitation in a region of the wind power installation; and
   a control unit configured to control operation of the wind power installation in a first operating mode based on a first pitch angle characteristic and in a second operating mode based on a second pitch angle characteristic,
     wherein the control unit is configured to select the first or second operating modes based on output signals of the precipitation sensor,
     wherein the first and second pitch angle characteristics respectively set the pitch angles in dependence on a same desired output power, and
     wherein the second pitch angle characteristic is different from the first pitch angle characteristic.

7. A wind power installation comprising a precipitation sensor and a controller configured to perform the method according to claim 1.

8. The method according to claim 1 wherein detecting precipitation comprises using a precipitation sensor to detect the precipitation.

9. The method according to claim 2, wherein the gradient of the second portion of the first pitch angle characteristic is different from the gradient of the second pitch angle characteristic.

* * * * *